United States Patent [19]
Firsich et al.

[11] Patent Number: 5,776,384
[45] Date of Patent: Jul. 7, 1998

[54] METHOD FOR MAKING CARBON SUPER CAPACITOR ELECTRODE MATERIALS

[75] Inventors: David W. Firsich, Dayton, Ohio; David Ingersoll, Albuquerque, N. Mex.; Frank M. Delnick, Dexter, Mich.

[73] Assignee: Sandia Corporation, Livermore, Calif.

[21] Appl. No.: 511,384

[22] Filed: Aug. 4, 1995

[51] Int. Cl.[6] .................................................. C01B 31/00
[52] U.S. Cl. ........................ 264/29.4; 264/29.6; 264/29.7
[58] Field of Search ................... 264/29.1, 29.4, 264/29.6, 29.7

[56] References Cited

U.S. PATENT DOCUMENTS

| | | | |
|---|---|---|---|
| 3,856,574 | 12/1974 | Amagi et al. | 429/218 |
| 4,597,028 | 6/1986 | Yoshida et al. | 361/305 |
| 5,603,867 | 2/1997 | Ohsaki et al. | 252/502 |

*Primary Examiner*—Christopher A. Fiorilla
*Attorney, Agent, or Firm*—Kurt C. Olsen; Timothy P. Evans

[57] ABSTRACT

A method for making near-net-shape, monolithic carbon electrodes for energy storage devices. The method includes the controlled pyrolysis and activation of a pressed shape of methyl cellulose powder with pyrolysis being carried out in two stages; pre-oxidation, preferably in air at a temperature between 200°–250° C., followed by carbonization under an inert atmosphere. An activation step to adjust the surface area of the carbon shape to a value desirable for the application being considered, including heating the carbon shape in an oxidizing atmosphere to a temperature of at least 300° C., follows carbonization.

16 Claims, 1 Drawing Sheet

METHOD FOR MAKING CARBON SUPER CAPACITOR ELECTRODE MATERIALS

STATEMENT OF GOVERNMENT INTEREST

This invention was made with Government support under contract no. DE - AC04- 94AL8500 awarded by the U. S. Department of Energy to Sandia Corporation. The Government has certain rights in the invention.

BACKGROUND OF THE INVENTION

This invention pertains generally to energy storage devices, particularly high specific power and high energy density capacitors, supercapacitors, and specifically to a method of making electrodes for the same.

There is a need for a rechargeable energy source that can provide high power, can be recharged quickly, has a high cycle life and is environmentally benign for a myriad of applications including defense, consumer goods and electric vehicles. Double layer capacitors are rechargeable charge storage devices that fulfill this need.

Double layer capacitors are devices in which two electrodes are electronically insulated from one another and which contain an electrolyte which permits ionic but not electronic conductivity. Applying an electric potential across the electrodes causes charge to build up in the double layer which exists at the electrode/electrolyte interface. This process can continue until a condition of equilibrium has been reached, i.e., the current drops to zero. The capacitance, or amount of charge that a capacitor can store, is directly related to the surface area of the electrodes. Therefore, electrodes made from conductive materials and that possess high surface area (>100 $m^2/g$) are desirable. By employing various materials and fabrication means capacitors have been developed which are capable of delivering very high specific power and energy densities.

Because carbon is chemically inert, has a high electronic conductivity, is environmentally benign and is relatively inexpensive, it is a desirable material for fabricating electrodes for supercapacitors. High surface area carbon powders are presently preferred for use in fabricating supercapacitor electrodes. The internal resistance of carbon powder electrodes is dependent upon the extent and quality of particle-to-particle contact. As the quality and extent of these contacts decreases the internal resistance of the electrode increases which in turn reduces the usable stored charge in the capacitor. In some applications the electrodes are often maintained under high compression in an attempt to make them more conductive. Binders are often used to fabricate freestanding electrodes from carbon powders. However, the binders, generally being of higher resistance than the carbon particles they surround, will increase the particle-to-particle resistance thereby degrading the performance of the electrodes.

In addition to methods well known in the art for fabricating high surface area carbon electrodes such as employing a binder, the use of carbon paste electrodes or high pressure, other methods of fabricating these electrodes to improve their conductivity have been developed. U.S. Pat. Nos. 5,150,283 and 4,327,400 disclose electrodes composed of electrically conducting substrates into which or upon which carbon powder in various forms is impressed. A method of fabricating electrodes which have high specific surface area is disclosed in U.S. Patent No. 4,597,028. Here activated carbon fibers are woven into a fabric which is used to fabricate electrodes. Compounds which improve the conductivity of carbon powder electrodes have been also employed as disclosed in U.S. Pat. No. 4,633,372. All these methods suffer from the disadvantage that they require additional fabrication steps which can be expensive and complex.

It has been recognized that one way to overcome the problems associated with carbon powder electrodes is to develop carbon in the form of a continuous, monolithic structure and prepared in such a way as to possess the desirable properties of high surface area and low electrical resistance. As illustrated in U.S. Pat. Nos. 5,260,855; 5,021,462; 5,208,003; 4,832,881; 4,806,290 and 4,775,655 carbon foams, aerogels and microcellular carbons have been developed which are useful as electrode materials in high energy density capacitor applications, because they possess high surface area, low electrical resistance and adequate mechanical strength. While these materials represent an improvement over conventional carbon powder electrodes for supercapacitors they have several disadvantages in comparison with the present invention. Methods used to prepare carbon foams, aerogels and microcellular carbons require elaborate processing steps to prepare the precursor materials; among other things, the solvents must be completely removed from the precursor prior to the carbonization step. In order not to disrupt the microstructure of the polymer precursor the solvent removal step must be done under carefully controlled conditions using, for example, freeze drying or supercritical extraction. Furthermore, the solvents must either be disposed of or purified prior to reuse. In addition, before the carbonized product produced by these prior art processes can be used additional fabrication steps, such as machining, must be employed. The method disclosed in the present invention overcomes the disadvantages of prior art processes for producing high surface area, continuous structure carbon electrodes.

It is well known in the art that the surface area of carbons, in the form of powder or a monolithic structure, can be increased by a process known as activation. Generally, the process involves exposing carbon to an oxidant which can be a gas or an oxidizing chemical. U.S. Pat. Nos. 3,652,902 and 4,327,400, for example, disclose a process for activating carbon powder by heating in steam or oxygen. While it has been recognized that activation could be used to enhance the surface area of carbon, heretofore little, if any, attempt has been made to control the process. The present invention employs a carefully controlled activation step to produce monolithic carbons having superior properties for use in double layer capacitors.

SUMMARY OF THE INVENTION

A method is disclosed for preparing carbon materials useful as electrodes in supercapacitors that have:

1) a continuous, porous structure whose density can be adjusted;
2) an adjustable surface area of at least 500 $m^2/g$;
3) high electrical conductivity;
4) high charge storage characteristics;
5) sufficient mechanical strength such that robust thin samples can be prepared and 6) the ability to be fabricated to near-net-shape.

The method of preparing improved carbon electrodes disclosed in the present invention includes the controlled pyrolysis and activation of a pressed shape of methyl cellulose powder (methyl cellulose compact) with pyrolysis being carried out in two stages; pre-oxidation in air, followed by carbonization under an inert atmosphere. During the pre-oxidation and carbonization steps the methyl cellulose compact shrinks uniformly without cracks or deformation. The activation step which follows carbonization adjusts the surface area of the carbon compact to a value desirable for the application being considered. For example, it is preferred that a supercapacitor electrode have a very high surface area. In addition to the fact that high conductivity binderless electrodes can be made by this process, the "near-net-shape" carbonization property of the present invention represents a significant advantage over other methods of preparing continuous carbon structures, vide supra, in that the machining necessary to prepare electrode structures associated with other methods is eliminated or greatly minimized. Furthermore, the present invention offers the additional advantage that a carbon monolith having a continuous, porous, high surface area structure can be fabricated from an inexpensive, readily-available, nontoxic precursor that need only be simply pressed and fired. Methyl cellulose can be pressed or extruded into samples that shrink uniformly upon carbonization providing a low-cost and flexible manufacturing process for carbon supercapacitor electrodes without the need for extensive machining.

The discharge rate of a carbon supercapacitor decreases as the electrode thickness increase. Therefore, it is advantageous to make thin carbon electrodes. The method of the present invention can be used to produce electrodes as thin as 0.010 inches without machining. Furthermore, these materials are robust enough that they can be made even thinner by processes known in the art, such as sanding. By using methyl cellulose gels as the precursor material it is possible to prepare carbon foam sheets no more than 0.002 inches thick.

The process disclosed herein combines the advantages of near-net-shape processing, a low cost and a nontoxic precursor material to provide a carbon structure with the preferred properties of high surface area, high porosity, high conductivity, a continuous structure, the ability to tailor the surface area of the carbon compact by means of an activation step and robust mechanical properties.

The novel features and advantages thereof over existing prior art forms, which will become apparent to those skilled in the art from detailed disclosure of the present invention as set forth hereinbelow, are accomplished by the improvements herein described and claimed.

DETAILED DESCRIPTION OF THE INVENTION

Figure 1:
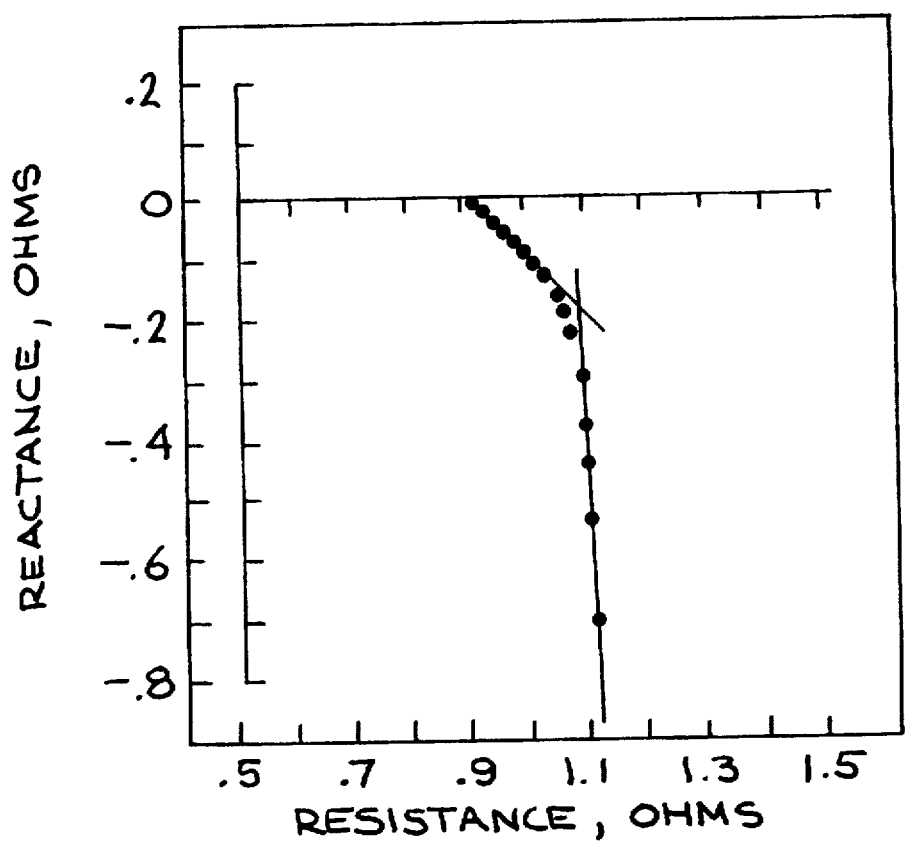
FIG. 1 shows the complex impedance of two identical methyl cellulose derived microcellular carbon electrodes in $H_2SO_4$ over the frequency range of 0.15 Hz to 60 kHz.

Described herein is a method of fabricating monolithic carbon electrodes that employs an inexpensive, nontoxic starting material, methyl cellulose, to provide a product that possesses a uniform, porous structure, good electrical conductivity, robust mechanical properties, a high surface area (at least 500 $m^2/g$), and can be produced to near-net-shape. These carbon electrodes are desirable for use in supercapacitors.

The preparative process comprises the following steps:
1) Pressing methyl cellulose powder into a compact at a pressure determined by the desired density of the final structure but preferably between 400–800 $lbs/cm^2$;
2) Preoxidizing the compact by placing it between two air-permeable plates and heating the compact in air to a temperature of at least 200° C. and preferably about 250° C.;
3) Carbonizing the pre-oxidized compact at temperatures between 700–1100° C. either in vacuum or, preferably, under an inert atmosphere; and
4) Activating the carbonized compact with an oxidizing agent at temperatures of from about 350°–800° C., preferably using air or carbon dioxide, although chlorine or water vapor can also be used.

The methyl cellulose compacts of the present invention are produced by methods known in the art namely; filling a die cavity with methyl cellulose powder, the die cavity having the shape desired in the final carbon product, and applying sufficient hydraulic pressure, typically between 400 and 800 $lbs/cm^2$ to the die set to produce a uniform, freestanding shape. While the preferred method of preparing the precursor material for carbon electrodes for supercapacitors presses methyl cellulose powder into a compact, another method of preparing precursor materials for these electrodes is possible. Methyl cellulose gels can be prepared by the methods known in the art, for example, U.S. Pat. No. 4,832,881 and 5,208,003, incorporated herein by reference. The methyl cellulose gel, prepared by any of the methods known in the art but preferably by mixing methyl cellulose powder in hot water to make a slurry, was cast as a sheet which was subsequently air-dried. The methyl cellulose sheet can either be cut into pieces or left as an integral structure for further processing. Subsequent processing is as set forth above, a controlled pyrolysis step followed by an activation step. Because methyl cellulose shrinks uniformly about 80% and there is an approximately 80% weight loss following the carbonization step, the die cavity must oversized accordingly. The methyl cellulose shape is pre-oxidized after it is removed from the die, the preferable process being to place the compacted powder between first and second air permeable platens, and then heat the platens to a temperature of about 250° C. for about 5 hours.

Carbonization preferably comprises heating the pre-oxidized shape to a temperature between 700° to 1100° C. at a rate of about 0.5° C./min. When the shape has reached the desired temperature it is maintained at that temperature for about 1 hour. The carbonization step is preferably done in an argon atmosphere although any inert gas or vacuum can be used.

According to this invention, in order to prepare carbon electrodes useful for supercapacitors from the methyl cellulose precursor material it is necessary to have a step of activation following the carbonization step. Typically, carbonized methyl cellulose has a surface area of less than 3 $m^2/g$. However, as shown in Table 1, by incorporating the step of activation, using an oxidizing agent such as oxygen or carbon dioxide, the surface area of the carbonized compacts can be significantly increased. Typical surface areas after activation are greater than 500 $m^2/g$ and typically between 800–1000 $m^2/g$. Furthermore, as shown in Table 1, by modifying the conditions of the activation process it is possible to tailor the increase in surface area of the carbon to any value desired.

TABLE 1

| Activation Parameters in $CO_2$ | | | |
|---|---|---|---|
| Sample | Temperature (C.) | Time (hrs) | Surface Area ($m^2/g$) |
| A6 | activation not performed | | 0.64 |
| B6 | 800 | 1 | 1711 |
| B16 | 800 | 0.1 | 875 |

The following examples are given to illustrate embodiments of this invention.

EXAMPLE 1

In one embodiment of the preferred process, three grams of methyl cellulose were pressed into a disk using a pressure of approximately 600 lbs/cm$^2$. The disk was pre-oxidized in air using the heat cycle: 0.5° C./min to 250° C., hold for 5 hours. The pre-oxidized disk was then carbonized in argon using the heat cycle: 0.5° C./min to 900° C., hold 1 hour. After cooling to room temperature, the carbon disk was activated in a $CO_2$ atmosphere with the heat cycle 2° C./min to 800° C. The final density of the activated sample was about 0.7 g/cm$^3$. The electrical resistivity (measured with a four point probe) wais 0.062 ohm-cm. The surface area, as measured by the BET method, was 875 m$^2$/g.

EXAMPLE 2

In another embodiment of the preferred process, three grams of methyl cellulose were pressed into a disk using a pressure of approximately 600 lbs/cm$^2$. The disk was pre-oxidized in air using the heat cycle: 0.5° C./min to 250° C., hold for 5 hours. The pre-oxidized disk was then carbonized in argon using the heat cycle: 0.5° C./min from room temperature to 1025° C., hold at 0125° C. for 1 hour. After cooling to room temperature, the disk was activated by heating it in dry air using the following cycle: 2° C./min to 385° C., 1° C./min from 385° C. to 390° C. and hold at 390° C. for 1 hour. The final density of the activated sample was about 0.7 g/cm$^3$. The electrical resistivity was 0.014 ohm-cm. The surface area, as measured by the BET method, was 790 m$^2$/g.

EXAMPLE 3

Dry methyl cellulose powder was mixed with hot water to make a slurry containing 35% solid by weight. After cooling to room temperature, the resulting gel was squeezed between platens with approximately 100 lbs/cm$^2$ force, removing most of the water and forming a 6 inch×6 inch sheet. The sample was then dried at room temperature, in a stream of air, to form a translucent sheet approximately 0.006 inches thick. This sheet was pre-oxidized, carbonized and activated using the procedure set forth in EXAMPLE 1 to produce a carbon sheet approximately 3 inches×3 inches on each side by 0.003 inches thick and having a density of 0.97 g/cm$^3$. The surface area, as measured by the BET method, was 743 m$^2$/g.

In order to demonstrate that the method of the present invention produces carbon electrodes suitable for use in supercapacitors, electrochemical impedance measurements were performed. FIG. 1 illustrates the results of measurements made on two carbon electrodes prepared by the method of this invention. The volume specific double layer capacitance is 58 F/cm$^3$ and the total capacitance (double layer plus charge transfer) was >300 F/cm$^3$.

It will be appreciated by those skilled in the art that the present invention is not restricted to the particular embodiments described herein and that variations can be made therein without departing from the scope of the present invention as defined in the appended claims and equivalents thereof.

We claim:

1. A method for making near-net-shape, monolithic carbon electrodes for energy storage devices having a uniform, continuous, porous structure, comprising the steps of:

a) providing a powder consisting essentially of methyl cellulose;

b) forming the powder into a shape;

c) pre-oxidizing the shape by heating in an oxidizing atmosphere;

d) carbonizing the pre-oxidized shape; and e) activating the carbonized shape.

2. The method of claim. 1 wherein said step of forming comprises pressing methyl cellulose powder in a die.

3. The method of claim 2 wherein the powder is pressed at a pressure of at least about 400 lbs/cm$^2$.

4. The method of claim 1 wherein the step of forming comprises preparing a gel by mixing methyl cellulose powder in water to form a slurry.

5. The method of claim 4 wherein the slurry comprises at least 35% by weight methyl cellulose powder.

6. The method of claim 4 wherein said step of forming further includes compressing the gel at a pressure of at least 75 lbs/cm$^2$.

7. The method of claim 1 wherein said step of pre-oxidizing comprises heating the shape in air between a first and a second platen, at least one of the platens being permeable to air.

8. The method of claim 7 wherein the platens are heated to a temperature of at least 200° C.

9. The method of claim 1 wherein said step of carbonizing comprises heating the pre-oxidized shape in an inert atmosphere to a minimum temperature of at least 700° C.

10. The method of claim 9 wherein the shape is heated at a rate of about 0.5° C./min.

11. The method of claim 9 further including maintaining the maximum temperature for about 1 hour.

12. The method of claim 9 wherein said step of carbonizing takes place in a vacuum.

13. The method of claim 1 wherein said step of activating comprises heating the carbonized shape to at least 300° C. in an oxidizing atmosphere.

14. The method of claim 13 wherein said oxidizing atmosphere is air, carbon dioxide, or chlorine and combinations thereof.

15. The method of claim 13 wherein the shape is heated at a rate of at least 0.5° C./min.

16. The method of claim 1, wherein the oxidizing atmosphere includes air.

* * * * *